United States Patent [19]
Hurley et al.

[11] Patent Number: 5,671,686
[45] Date of Patent: Sep. 30, 1997

[54] AUTOMOTIVE CONSOLE WRITING TABLE

[75] Inventors: Gregory M. Hurley, Jackson; Kevin Whalen, Ann Arbor, both of Mich.

[73] Assignee: Manchester Plastics, Inc., Troy, Mich.

[21] Appl. No.: 599,683

[22] Filed: Feb. 12, 1996

[51] Int. Cl.[6] .................................................. A47B 23/00
[52] U.S. Cl. .................................................. 108/45; 108/26
[58] Field of Search .................................. 108/45, 44, 43, 108/26; 297/188.16, 188.19; 224/277, 42.42; 296/37.8

[56] References Cited

U.S. PATENT DOCUMENTS

| | | | |
|---|---|---|---|
| 2,524,909 | 10/1950 | Hines | 297/188.19 X |
| 2,773,705 | 12/1956 | Hirak | 108/44 X |
| 3,083,998 | 4/1963 | Morris | 297/188.19 X |
| 3,632,158 | 1/1972 | Boothe | 108/44 X |
| 4,511,072 | 4/1985 | Owens | 108/45 |
| 4,928,865 | 5/1990 | Lorence et al. | |
| 5,143,337 | 9/1992 | Tomayko, Jr. et al. | 108/44 X |
| 5,218,912 | 6/1993 | Buske | 108/26 |
| 5,316,368 | 5/1994 | Arbisi | 297/188.19 |
| 5,322,021 | 6/1994 | Jackson | |
| 5,372,403 | 12/1994 | Puerto | |
| 5,390,609 | 2/1995 | McKee | |

*Primary Examiner*—Jose V. Chen
*Attorney, Agent, or Firm*—Bliss McGlynn, P.C.

[57] ABSTRACT

A writing table (10) includes a hinge (16) and support table (18) pivotally secured to the hinge (16). The hinge (16) secures the support table (18) to a trim member (14), such as in a vehicle. The hinge (16) and support table (18) may be molded of plastic. The support table (18) is molded in two halves and secured about the hinge (16). The writing table (10) includes an interacting stop (34) operatively connected between the hinge (16) and support table (18) to establish the full movement between full open and closed positions. Also included are resistance members (36) to provide resistant and controlled movement of the support table (18) between the open and closed positions.

29 Claims, 3 Drawing Sheets

AUTOMOTIVE CONSOLE WRITING TABLE

BACKGROUND OF THE INVENTION

1. Technical Field

The invention relates to a pivotable writing table which may move between stored and open or accessible positions, and more particularly, toward a writing table which is secured to a trim member such as a console of a vehicle.

2. Description Of the Related Art

As people spend more time in their vehicles and conduct business out of their vehicles, it has become more important to have accessible writing materials available for taking notes. There is known in the prior art writing tables which are adhesively secured within a vehicle as an after market product. Other tables or desk-type apparatuses have been designed to be secured to the console area of the vehicle. Such designs are generally removably secured at the console area or arm rest. One such design is illustrated in the U.S. Pat. No. 5,390,609 in the name of Mckee issued Feb. 21, 1995. The patent discloses a separate desk structure attached to a console near the gear shift. This design is large and cumbersome.

U.S. Pat. No. 5,322,021 in the name of Jackson issued Jun. 21, 1994 discloses a collapsible, portable desk. A writing top is added to the console by velcro connection or by other means, so that fold out portions may be opened to form the table. A center leaf fits substantially down within the opening between and abutting the seat cushion to be immovably held therein by pressure of the seat cushions and weight of the desk. The writing top is supported thereby.

U.S. Pat. No. 5,372,403 in the name of Puerto issued Dec. 13, 1994 discloses an extendable writing tablet from within the arm rest. The tablet slides from a retracted position within the arm rest to an extended position outwardly from the end of the arm rest.

U.S. Pat. No. 4,928,865 in the name of Lorence et al. issued May 29, 1990 discloses an openable arm rest console which provides a writing tablet. The top of the arm rest is open to allow access to a cavity including a writing table therein.

It is desired to have a writing table which is simple in design and manufacture, while minimizing the space necessary to utilize and store such table.

SUMMARY OF THE INVENTION

The invention is a table assembly supported by a trim member of a vehicle. The assembly comprises a hinge fixably secured to the trim member. A support table having a first end is pivotally secured to the hinge. The support table is pivotal between an open position and a closed position about the hinge. The support table includes a first surface providing a writing table in the open position and a second surface opposing the first surface providing a cover surface extending with the trim member in the closed position. The support table also includes a second free end spaced from the trim member in the open position and adjacent the trim member in the closed position.

Other features include the hinge having an interacting stop for supporting the support table with respect to the trim member in the closed position and in the open position at a predetermined angle. Also included are resistance members to provide resistive and controlled movement between the closed and opened positions.

Other features and advantages of the present invention will be readily appreciated as the same becomes better understood after reading the subsequent description when considered in connection with the accompanying drawings.

DESCRIPTION OF THE PREFERRED EMBODIMENT

Figure 1:
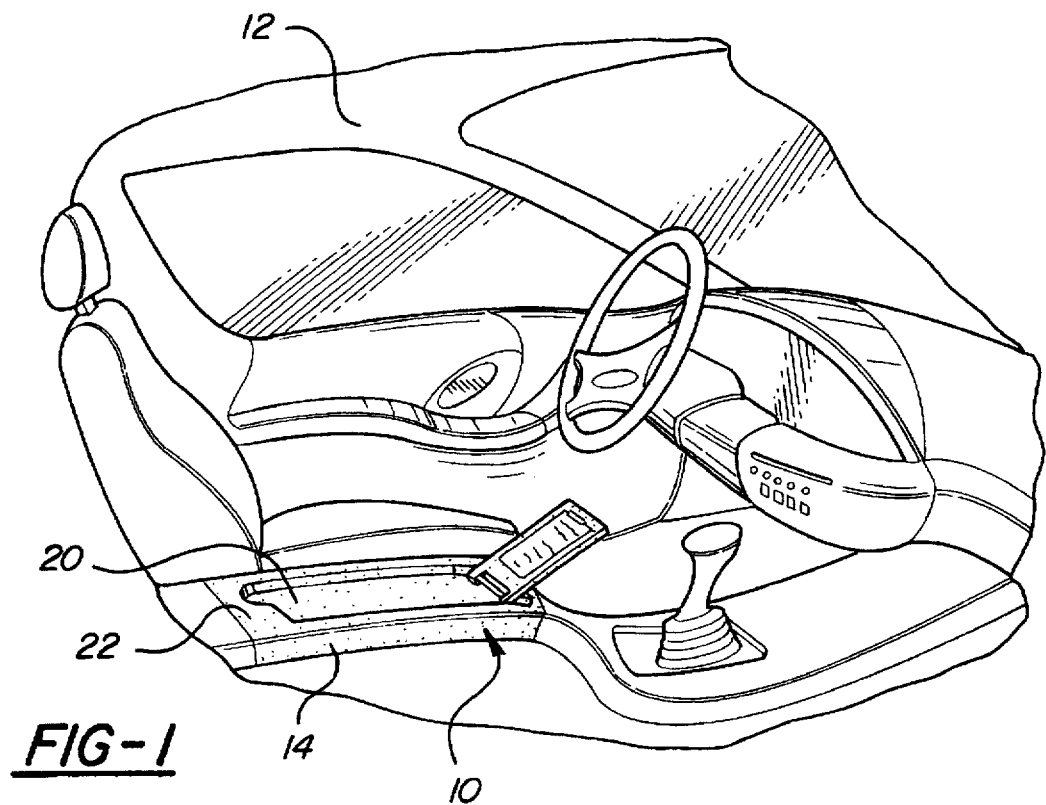
FIG. 1 is a perspective view of the subject invention in operation in a vehicle.

A table assembly 10 is generally illustrated in FIG. 1 and is shown as used in a vehicle 12. The table assembly 10 is supported by a trim member 14, typically a console or arm rest. However, it is to be appreciated that the table assembly 10 may be supported by other trim members 14 of a vehicle 12, or utilized in applications other than a vehicle, which uses are within the teachings of the subject invention.

The table assembly 10 includes a hinge 16 fixably secured to the trim member 14. The table assembly 10 also includes a support table 18 pivotally secured to the hinge 16. The support table 18 moves between a closed position lying against the trim member 14 and an open position for use as a writing table. In the preferred embodiment, the trim member 14 includes a recessed cavity 20 recessed from the upper surface 22 of the trim member 14 for receiving the support table 18 therein such that the support table 18 will lie substantially level or planar with the upper surface 22 of the trim member 14 during use as part of the arm rest. In the closed position, the trim member 14 and support table 18 are utilized in combination as an arm rest. When the support table 18 is moved to the open position, the recessed cavity 20 may still be used as an arm rest, especially when utilizing the support table 18 as a writing table. The support table 18 is angled from the closed position and the upper surface 22 to allow ease in viewing and writing on the support table 18. The hinge 16 is secured to the trim member 14 also within the recess 20.

The support table 18 includes a first surface 24 providing a writing surface in the open position and a second surface 26 opposing the first surface 24 and providing a cover surface extending with the trim member 14 in the closed position, e.g., forming a portion of the upper surface of the arm rest. The support table 18 has a first end 28 which is pivotally secured to the hinge 16. A second free end 30 is spaced from the trim member 14 in the open position and adjacent the trim member 14 in the closed position. The support table 18 also includes a holder member 32 connected at the second free end 30 on the first surface 24 to secure sheet material, such as a writing tablet or paper, to the support table 18. The holder member 32 may be typically a type of clip or clamp, or any other securing member.

The table assembly 10 further includes an interacting stop 34 operatively connected between the hinge 16 and the support table 18 for supporting the support with respect to the trim member 14 in the closed position within the recessed cavity 20, and in the open position at a predetermined angle with respect to the trim member 14. The support table 18 is supported flush with the recessed cavity 20 and upper surface 22 of the trim member 14 in the closed position. In the open position, it is desirable to support the support table 18 at an angle from the trim member 14 to allow easy viewing and writing by the user. Such angle is approximated at a 152° from the closed position, which closed position is substantially horizontal. However, it is to be appreciated that this angle may vary as desired.

The table assembly 10 also includes resistant members 36 operatively connected between the hinge 16 and the support table 18 to provide resistance in movement of the support table 18 between the closed and open position. The resistance members 36 include detent areas 38 at the open and closed positions to cease resistance, and to bias and maintain the support table 18 in the open and closed positions.

Figure 4:
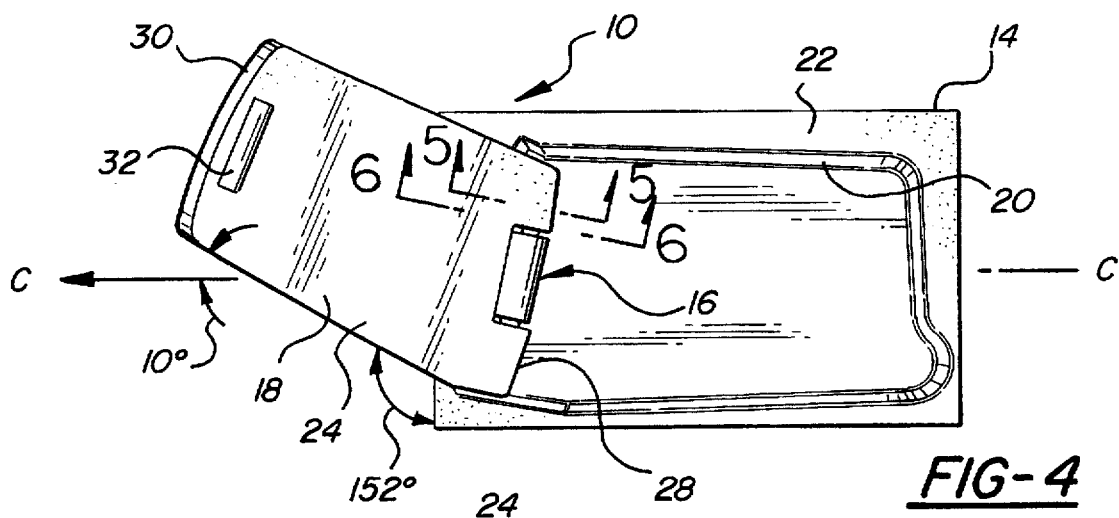
FIG. 4 is a perspective view of the subject invention in the open position.

As best illustrated in FIG. 4, the support table 18 is angled approximately 10° off the center line C of the longitudinal cavity 20 toward the driver of the vehicle 12. The hinge 16 is angled 10° off the center line C and in the cavity 20 as illustrated to cause such twisting motion of the support table 18 when moved from the closed position (flat within the recess 20 and extending longitudinally along the centerline C) to the open position. The twisting motion or skewed position is accomplished by the hinge 16 being angled with respect to the centerline and by the retaining arms 48 (subsequently discussed) being of different longitudinal length.

The more specific design of the table assembly 10 is illustrated in FIGS. 2–6. The support table 18 includes first and second molded support halves 40, 42 providing the first and second planar surfaces 24, 26, respectively, on the external surfaces of the halves 40, 42. The support halves 40, 42 are secured to one another about the hinge 16. The support halves 40, 42 are generally plastic molded of a rigid and structural material and are each provided with a cavity 41, 43 forming a hollow chamber of the support table 18 when assembled. Side walls forming the cavities 41, 43 extend about the perimeter of each half 40, 42, which mate with one another when assembled. Ribs 46 are molded traverse within the cavities 41, 43 and extend between the side walls 45 to provide added structural support. The support halves 40, 42 are snap fit to one another by plurality of mating snaps coacting between each of the support halves 40, 42 on ribs 46 and sidewalls 45. The mating snaps 44 may include recess 44a formed in one of the halves 40, 42 and a flexing arm with mating tab 44b in the other of the halves 42, which extends into the cavity 41, 43 to engage the recess 44a.

The support halves 40, 42 are generally rectangular in shape and include a pair of spaced retaining arms 48 extending from the first end 28 thereof. The retaining arms 48 are mirror images of each other, except that a driver arm 48a is angled approximately 10° from the rectangular body of the table 18 and extends a longitudinal length greater than the longitudinal length of the passenger arm 48b. The passenger arm 48b extends straight with the longitudinal length of the rectangular body. This allows the hinge 16 to be connected to the table 18 at an angle with respect to the longituding body. The first end 28 is also angled at 10° from the body to lie parallel to the hinge 16. Adjacent the retaining arms 48 are molded screw bosses 50 to receive a fastener therein to secure the halves 40, 42 to one another.

The first support half 40 includes a portion of the resistant members 36 and interacting stop 34. The opposing second half 42 includes a hollow cavity in this portion of the retaining arms 48.

The first support half 40 includes a control boss 52 formed within the cavity 41 and forming a portion of the resistance member 36. The control boss 52 is generally cylindrical in shape. Also included is a stop projection 54 extending within the cavity 41 which forms a portion of the interacting stop 34. The stop projection 54 is generally a rectangular projection. These will be described subsequently with respect to the hinge design.

The hinge 16 includes a molded base member 56. The base member 56 includes a rectangular, secured portion 58 fixably connected to the trim member 14, and also includes retainer portions 60 with the support halves 40, 42 rotatably connected thereon. The secured portion 58 is located between the retaining arms 48 external of the support halves 40, 42. The retaining portions 60 are sandwiched between the retaining arms 48. The secured portion 58 may include a plurality of apertures 62 at the base thereof to secure the hinge 16 and therefore the table assembly 10 to the trim member 14 by suitable fasteners. The hinge 16 also includes a cover 64 secured over the secured portion 58. The cover 64 may be snapped fit over the secured portion 58 also by mating snaps or ribs (not shown).

The retainer portions 60 extend outwardly on opposite ends of the secured portion 58 and within the retaining arms 48. Each of the retainer portions 60 are mirror images of one another as with the retaining arms 48. The retainer portions 60 are generally cylindrical in shape (with cutouts formed therein as discussed) extending longitudinally outwardly from the secured portion 58. The retainer portions 60 include the detent areas 38 formed within the outer most portion thereof. The detent areas 38 are formed by two pockets 68 angularly spaced from one another about the retainer portions 60 to receive the control boss 52 therein. The pockets 68 are sized to substantially the same diameter of the control boss 52. The pockets 68 are interconnected by arcuate arms 70 parallel to and spaced from one another at a distance less than the cross-section of the control boss 52 and pockets 68, and extending between the pockets 68 forming the detent areas 38. The arms 70 are able to flex slightly to allow the boss 52 to slide between the arms 70 and between the pockets 68 providing the resistance during rotation of the support table 18 between the open and closed positions. Due to the size of the pockets 68, the control boss 52 is biased to remain in the pockets 68. The pockets 68 are separated by approximately 152°, which is the full pivotal movement between the open and closed positions of the support table 18.

Adjacent the arms 70 and detent areas 38 is an arcuate stop control 72 which coacts with the stop projection 54 to stop and support the support table 18 at the fully closed position and at the fully open position. The stop control 72 is formed of an arcuate slot cut into the retainer portions 60 to receive the stop projection 54 therein. The arcuate slot extends for the approximately 152° representing full movement between the open and closed positions. The ends of the arcuate slot interact with the stop projection 54 to prevent further rotation and to support the support table 18. It provides further support to relieve stress on the boss 52.

Adjacent the hinge 16 on the interior sides of the retaining arms 48 along the sidewalls 45 are positioned two parallel sidewalls to provide a contact point with the hinge 16 and retainer portion 60 thereof for added support.

Figure 2:
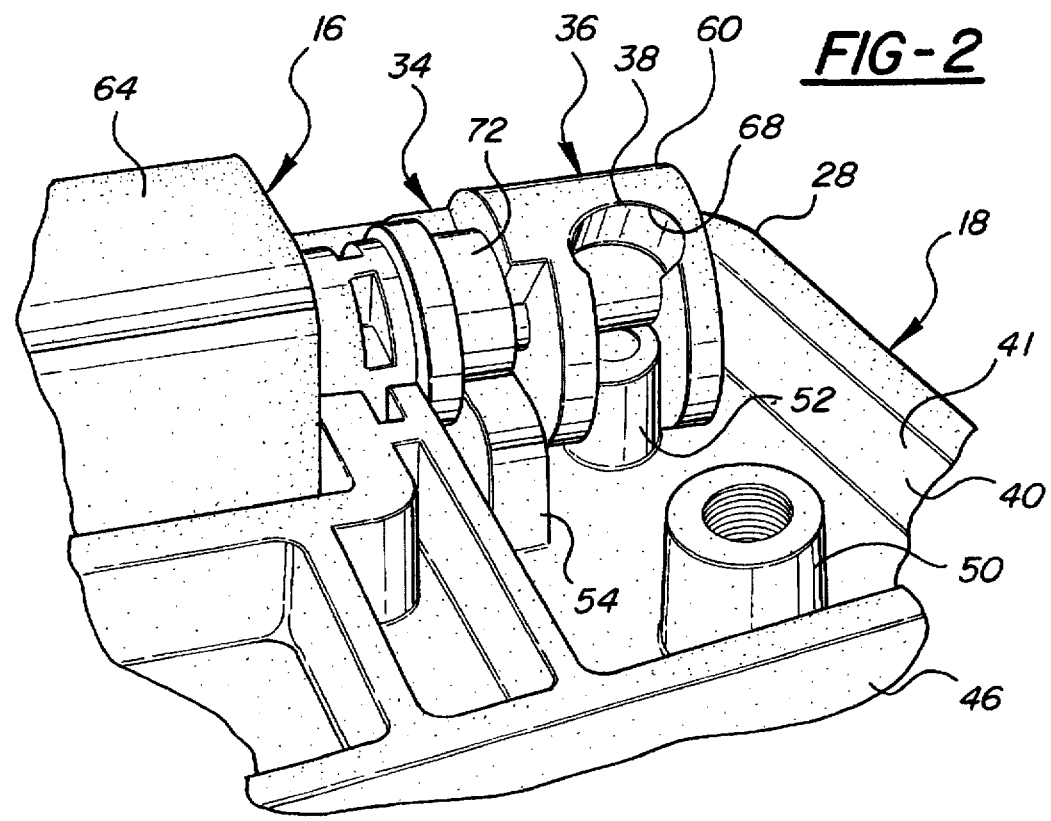
FIG. 2 is an enlarged view of the hinge and half of the support table in the closed position.
Figure 3:
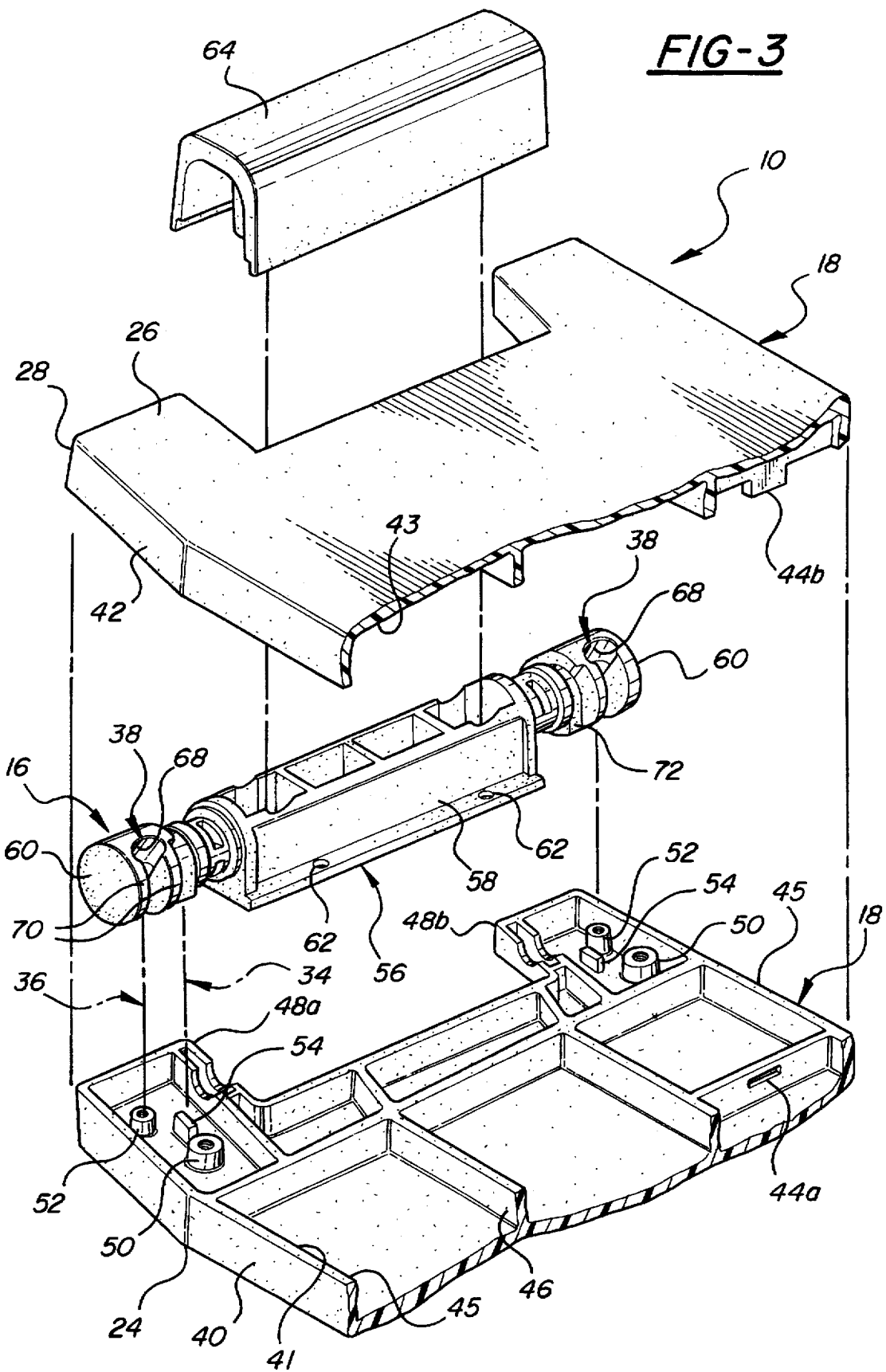
FIG. 3 is an exploded view of the subject invention.
Figure 5:
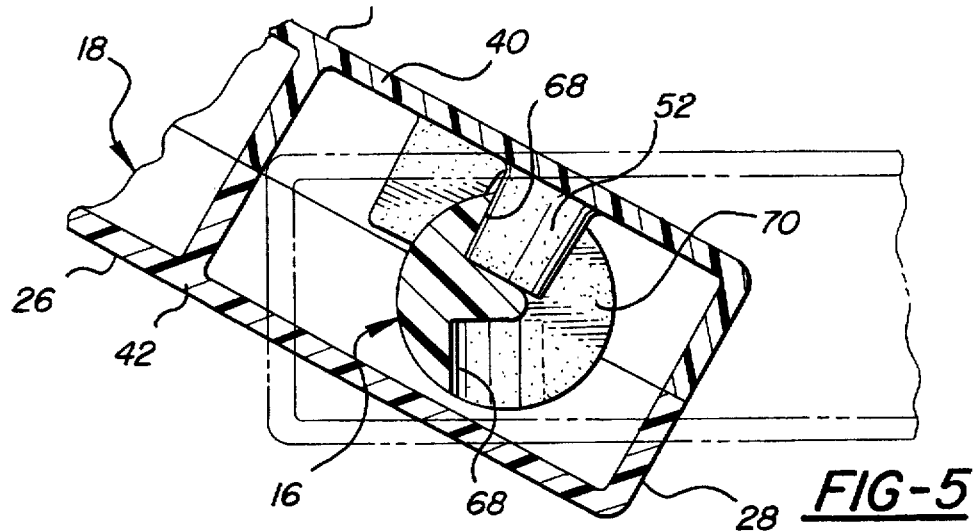
FIG. 5 is cross-sectional view taken along lines 5—5 of FIG. 4.
Figure 6:
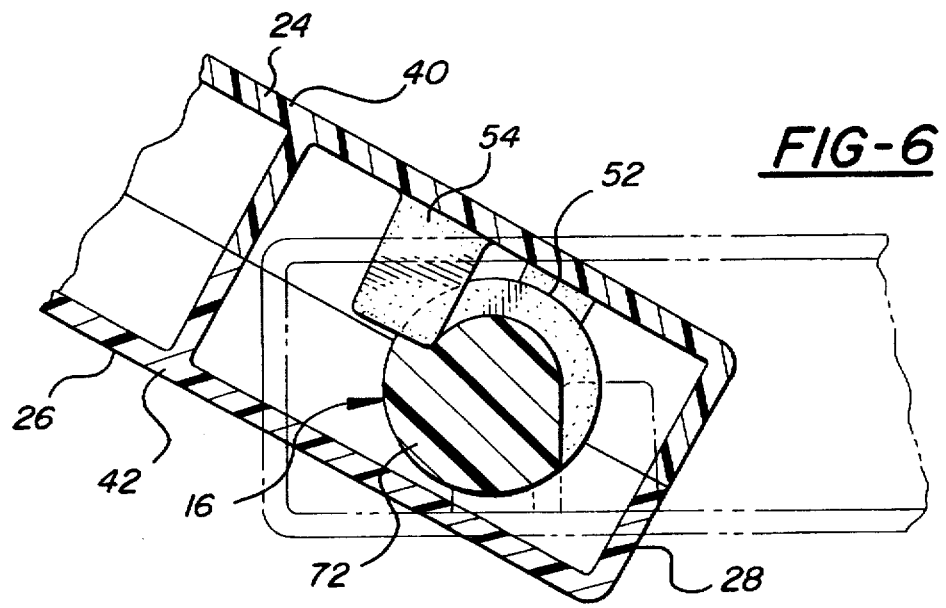
FIG. 6 is a cross-sectional view taken along lines 6—6 of FIG. 4.

Operation of the table assembly 10 can be best seen and illustrated in FIGS. 2 and 5–6. FIG. 2 illustrates the table assembly 10 in the closed position. The closed position is illustrated in phantom in FIGS. 5–6. The open position is illustrated in solid lines of FIGS. 5–6. When the table assembly 10 is in the closed position, the control boss 52 rests within the lowermost detent pockets 68 (see FIG. 2) and the stop projection 54 rests against a first and of the stop control 72. The phantom lines of FIG. 5 illustrate the boss 52 in the 68 and FIG. 6 illustrates the stop projection 54 and arcuate stop control 72. When a user moves the support table 18 from the closed position of FIG. 2 to the open position of FIGS. 5 and 6, boss 52 is removed from the first of the detent pockets 68 and the arms 70 are fixed outwardly to provide clearance for rotating the boss 52 therebetween. This provides resistance in movement of the support table 18. This also provides a controlled movement of the support table 18. The user moves the support table 18 to the open position wherein the boss 52 is placed within the uppermost detent pockets 68 and the stop projection 54 rests against the other wall of the arcuate stop control 72. This allows a secured position between the fully open and fully closed positions. In the open position, the user may use the port 18 as a writing table.

The table assembly 10 is molded of plastic material in the preferred embodiment. Other materials may be used.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A table assembly supported by a trim member of a vehicle, said assembly comprising:

a hinge fixedly secured to the trim member;

a support table having a first end pivotally secured to said hinge, said support table including a first surface providing a writing table in an open position and a second surface opposing said first surface and providing a surface extending with the trim member in a closed position, and having a second free end spaced from said trim member in said open position and adjacent the trim member in said closed position, said hinge connected to said support table so that said support table extends along a centerline perpendicular to one of said ends and establishing a centerline plane perpendicular to said first surface in said closed position and said support table is skewed from perpendicular to said centerline plane in said open position.

2. An assembly as set forth in claim 1 further including an interacting stop connected between said hinge and said support table for supporting said support with respect to the trim member in said closed position and in said open position at a predetermined angle.

3. An assembly as set forth in claim 2 wherein said support table includes first and second molded support halves providing said first and second surfaces, respectively on an external surface and secured to one another about said hinge.

4. An assembly as set forth in claim 3 wherein said hinge includes a molded base with a secured portion fixedly connected to a trim member and retainer portions extending outwardly from said secured portion rotatably connected between said support halves.

5. An assembly as set forth in claim 4 wherein said hinge includes a cover portion secured over said secured portion.

6. An assembly as set forth in claim 1 wherein said support includes a holder member connected at said second end on said first surface to secure sheet material to said support table.

7. An assembly as set forth in claim 1 further STET resistance members connected between said hinge and said support table to provide resistance in movement of said support table between said closed and opened positions.

8. Art assembly as set forth in claim 1 wherein said resistance members includes detent areas at said open and closed positions to cease resistance and establish said open and close positions.

9. A table assembly supported by a trim member of a vehicle, said assembly comprising:

a hinge fixedly secured to the trim member;

a support table having a first end pivotally secured to said hinge for pivoting the support table between an open position and a closed position about said hinge and having a second free end spaced from said trim member in said open position and adjacent the trim member in said closed position; and resistance members connected between said hinge and said support table to provide controlled resistance in movement of said support table between said closed and opened positions.

10. An assembly as set forth in claim 9 wherein said resistance members includes detent areas at said open and closed positions to cease resistance and establish said open and close positions.

11. An assembly as set forth in claim 10 wherein said hinge includes a base with a secured portion fixedly connected to a trim member and retainer portions extending outwardly from said secured portion rotatably connected between said support halves.

12. An assembly as set forth in claim 11 wherein said support table includes a cavity therein about said retainer portions, said cavity including a control boss extending therefrom and engaging said retainer portions.

13. An assembly as set forth in claim 12 wherein said retainer portions include a pair of angularly spaced pockets forming said detent areas for receiving said control boss in said open and closed positions, respectively.

14. An assembly as set forth in claim 13 wherein said retainer portions include a pair of arcuate, spaced arms interconnecting said pockets forming said resistance members, said spaced arms frictionally receiving said control boss therebetween as said support table moves between said open and closed positions.

15. An assembly as set forth in claim 14 wherein said control boss is of a first diameter, said arms spaced less than said first diameter so that said arms are flexed outwardly to receive said control boss therebetween and to cause frictional movement therein.

16. An assembly as set forth in claim 15 further including an interacting stop connected between said hinge and said support table for supporting said support with respect to the trim member in said closed position and in said open position at a predetermined angle.

17. An assembly as set forth in claim 15 wherein said support table includes first and second molded support halves providing said first and second surfaces, respectively on an external surface and secured to one another about said hinge.

18. An assembly as set forth in claim 1 wherein said hinge is connected with said support table at a non-perpendicular angle with respect to said center line.

19. An assembly as set forth in claim 18 wherein said support table includes at least two retaining arms extending first and second longitudinal lengths, respectively, from said first end and connected to said hinge, said first longitudinal length greater than said second longitudinal length.

20. An assembly as set forth in claim 9 wherein said hinge is connected to said support table so that said support table extends along a centerline establishing a centerline plane therethrough perpendicular to said first surface in said closed position and said support table is skewed from perpendicular to said centerline plane in said open position.

21. An assembly as set forth in claim 20 wherein said hinge is connected with said support table at a non-perpendicular angle with respect to said center line.

22. An assembly as set forth in claim 21 wherein said support table includes at least two retaining arms extending first and second longitudinal lengths, respectively, from said first end and connected to said hinge, said first longitudinal length greater than said second longitudinal length.

23. A table assembly supported by a trim member of a vehicle, said assembly comprising:
   a hinge fixedly secured to the trim member;
   a support table having a first end pivotally secured to said hinge, said support table including a first surface providing a writing table in an open position and a second surface opposing said first surface extending with the trim member in a closed position, and having a second free end spaced from the trim member in said open position and adjacent the trim member in said closed position;
   said hinge including a base with a secured portion fixedly connected to the trim member and retainer portions extending form said secured portion rotatably connected with said first end;
   said support table including a cavity therein about said retainer portions, said cavity including a control boss extending therefrom and engaging said retainer portions.

24. An assembly as set forth in claim 23 further including resistance members connected between said hinge and said support table to provide controlled resistance in movement of said support table between said closed and opened positions.

25. An assembly as set forth in claim 24 wherein said resistance members include a pair of angularly spaced pockets forming detent areas for receiving said control boss in said open and closed positions, respectively.

26. An assembly as set forth in claim 25 wherein said retainer portions include a pair of arcuate, spaced arms interconnecting said pockets forming said resistance members, said spaced arms frictionally receiving said control boss therebetween as said support table moves between said open and closed positions.

27. An assembly as set forth in clam 26 wherein said control boss is of a first diameter, said arms spaced less than said first diameter so that said arms are flexed outwardly to receive said control boss therebetween and to cause frictional movement therein.

28. An assembly as set forth in claim 27 wherein said hinge is connected to said support table so that said support table extending along a centerline establishing a centerline plane therethrough perpendicular to said first surface in said closed position and said support table is skewed from perpendicular to said centerline plane in said open position.

29. A table assembly supported by a trim member of a vehicle, said assembly comprising:
   a vehicle trim member having an upper surface and a recessed cavity recessed from said upper surface;
   a hinge fixedly secured to said trim member;
   a support table having a first end pivotally secured to said hinge, said support table including a first surface providing a writing table in an open position and a second surface opposing said first surface extending with the trim member in a closed position so that said support table lies within said recessed cavity and said second surface is substantially level with said upper surface of said trim member, said support table having a second free end opposing said first end and spaced from said trim member in said open position and adjacent the trim member in said closed position said hinge includes control members that supply and limit movement of said support table at said open position at an angle greater than perpendicular to said closed position so that said first surface supports writing activity thereon.

* * * * *

UNITED STATES PATENT AND TRADEMARK OFFICE
CERTIFICATE OF CORRECTION

PATENT NO. : 5,671,686
DATED : September 30, 1997
INVENTOR(S) : Gregory M. Hurley et al.

It is certified that error appears in the above-indentified patent and that said Letters Patent is hereby corrected as shown below:

Column 3, line 37, after "walls" insert -- 45 --.

Column 3, line 43, after "snaps" insert -- 44 --.

Column 3, line 46, after "42" insert -- 40 --.

Column 6, Claim 7, line 1, "STET" should be -- including --.

Column 6, Claim 9, line 7, after "free end" insert -- opposing said first end and --.

Signed and Sealed this

Sixteenth Day of December, 1997

Attest:

BRUCE LEHMAN

Attesting Officer

Commissioner of Patents and Trademarks